United States Patent [19]

Struthers

[11] 4,275,125
[45] Jun. 23, 1981

[54] FUEL CELL

[75] Inventor: Ralph C. Struthers, Saugus, Calif.

[73] Assignee: Universal Fuel Systems, Inc., Saugus, Calif.

[21] Appl. No.: 126,686

[22] Filed: Mar. 3, 1980

[51] Int. Cl.[3] .......................................... H01M 12/06
[52] U.S. Cl. ....................................... 429/29; 429/46; 429/48
[58] Field of Search ........................ 429/29, 46, 27, 48

[56] References Cited

U.S. PATENT DOCUMENTS

| | | | |
|---|---|---|---|
| 3,513,031 | 5/1970 | Zaromb | 429/29 |
| 3,563,803 | 2/1971 | Katoh | 429/29 |
| 3,825,445 | 7/1974 | MacCarthy | 429/29 X |
| 3,850,693 | 11/1974 | Kordesch | 429/46 |
| 3,880,671 | 4/1975 | Kordesch et al. | 429/46 |
| 3,915,748 | 10/1975 | Weidlich | 429/27 X |

Primary Examiner—Anthony Skapars

Attorney, Agent, or Firm—Georges A. Maxwell

[57] ABSTRACT

A fuel-air cell comprising an anode of readily corrodable metal such as aluminum or magnesium, a porous substantially non-corrosive cathode spaced from the anode and a caustic fluid electrolyte between and contacting the anode and cathode, said electrolyte is a mixture of a base having equivalent ionic conductance value of 180 or higher when tested in concentrations of 0.5 M and an acid having equivalent ionic conductance values of 100 or higher when tested in concentrations of 0.5 M and proton transfer reactance (PK1) values less than 1.0; whereby no corrosion of the anode occurs when, by varying the proportioning of the base and acid, the PH of the electrolyte is at or below 7, no appreciable corrosion of the anode occurs when the PH of the electrolyte is between 7 and 14; and minor corrosion of the anode occurs when the PH of the electrolyte is above 14.

11 Claims, 4 Drawing Figures

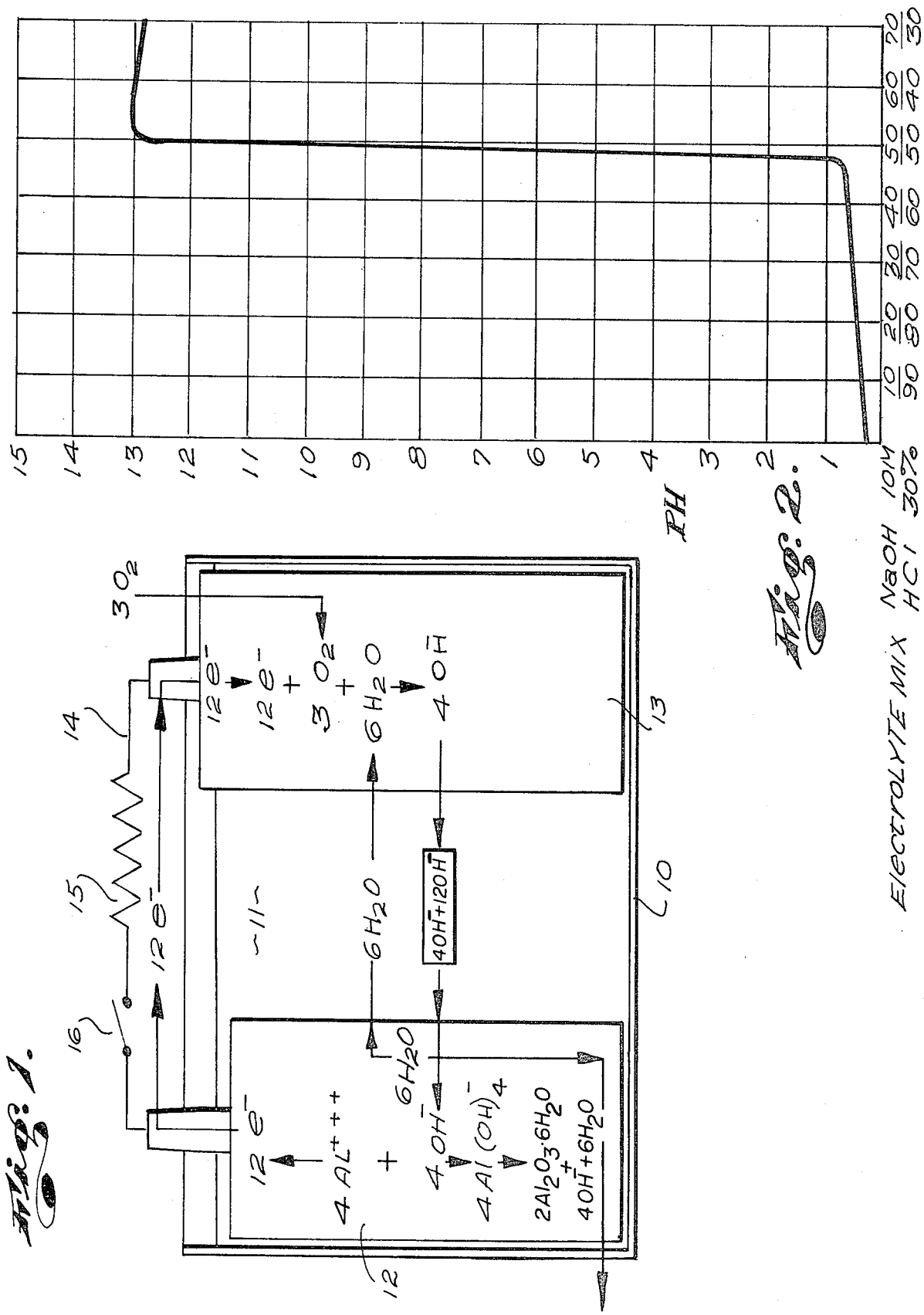

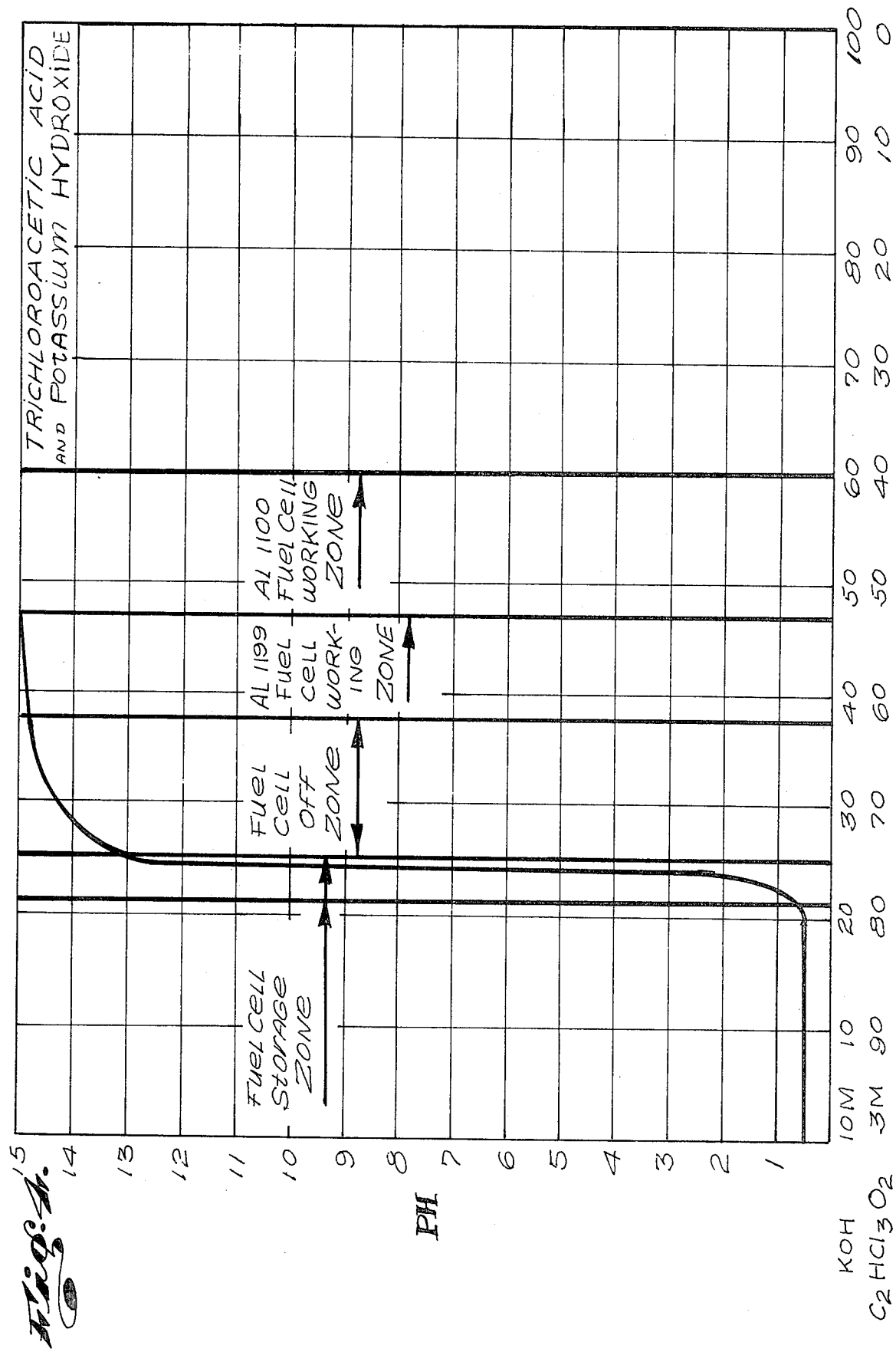

FUEL CELL

This invention has to do with a fuel cell and is particularly concerned with an improved metal-air fuel cell.

In the art of fuel cells which comprise a pair of spaced electrodes of dissimilar material and an electrolyte in contact with and extending between the electrodes, the anode electrodes are most commonly and preferably formed of suitable metals which react electrochemically with selected electrolytes when the circuits of the cells are closed. A strong electrochemical reaction between the anodes and electrolytes is considered necessary for the generating of a strong electric current.

While an electrochemical reaction between the anodes and electrolytes in itself is desirable when the circuits of cells are closed, it is of equal importance that the metals of the anodes, when subjected to their related electrolytes, not corrode rapidly or at an excessive rate when the cells are in or out of service.

If the anodes of cells are established of metals which are corroded rapidly and continuously by their related electrolytes, the cells deteriorate rapidly and have little or short shelf-life. Further, corrosion of the metal electrodes generates hydrogen gas which collects on the electrodes to electrically insulate the electrodes and prevent or inhibit the cells from functioning as intended, when they are put into service and their circuits are closed.

To provide anodes for fuel cells which react sufficiently (electrochemically) with their related electrolytes, when the circuits of the cells are closed, and which, on the other hand, do not corrode at an excessive rate in the presence of their related electrolytes, the prior art has determined that certain metals (such as nickel), which are quite resistive to corrosion, make superior or suitable anode electrodes and that certain other metals, such as aluminum and magnesium, are, as a general rule, unsuitable for establishing anode electrodes since those electrolytes with which those metals will suitably react, when the circuits of the cells are closed, are so corrosive to those metals that use of those metals in cells is considered impractical.

Most of those metals which the prior art uses in establishing the anode electrodes of cells are costly and heavy metals which are in short or limited supply. The high cost, weight and short supply of such metals work to limit the practical use of fuel cells.

It is readily apparent that if aluminum, magnesium and certain other of those metals which are inexpensive, light and in abundant supply could be put to effective and efficient use as anode electrodes in fuel cells, the practical use of fuel cells would be materially extended.

It is also apparent that if metals, such as aluminum, are to be effectively used to establish the anode electrodes in fuel cells, special and novel electrolytes which will react electrochemically to generate desired ionic transfer between the anodes and their related cathodes, when desired, but will not normally act to corrode the electrodes at an excessive or undesirable rate, must be provided.

To the best of my knowledge and belief, no one in the prior art has provided an electrolyte for metal-air fuel cells which is such that aluminum can be effectively and practically used to establish the anodes in such cells.

An object and feature of my invention, is to provide a novel metal-air fuel cell having an aluminum anode and a novel electrolyte which has limited, controllable corrosive effect on or with the anode.

Another object and feature of my invention is to provide a novel cell of the general character referred to above wherein the PH of the novel electrolyte can be and is varied between narrow limits where it is non-corrosive with the anode and places the cell in a non-operational mode for effective storage and where it can, upon increase of the PH, place the cell in an operational mode for effective generating of electric current.

The foregoing and other objects and features of this invention will be fully understood from the following detailed description of a typical preferred form and embodiment of the invention, throughout which description reference is made to the accompanying drawings:

DESCRIPTION OF THE DRAWINGS

FIG. 1 is a diagrammatic view of a cell embodying my invention;

FIG. 2 is a graph showing the PH curve of an electrolyte;

FIG. 4 is a graph showing the operating curve of my new cell;

DETAILED DESCRIPTION OF THE INVENTION

Figure 3:
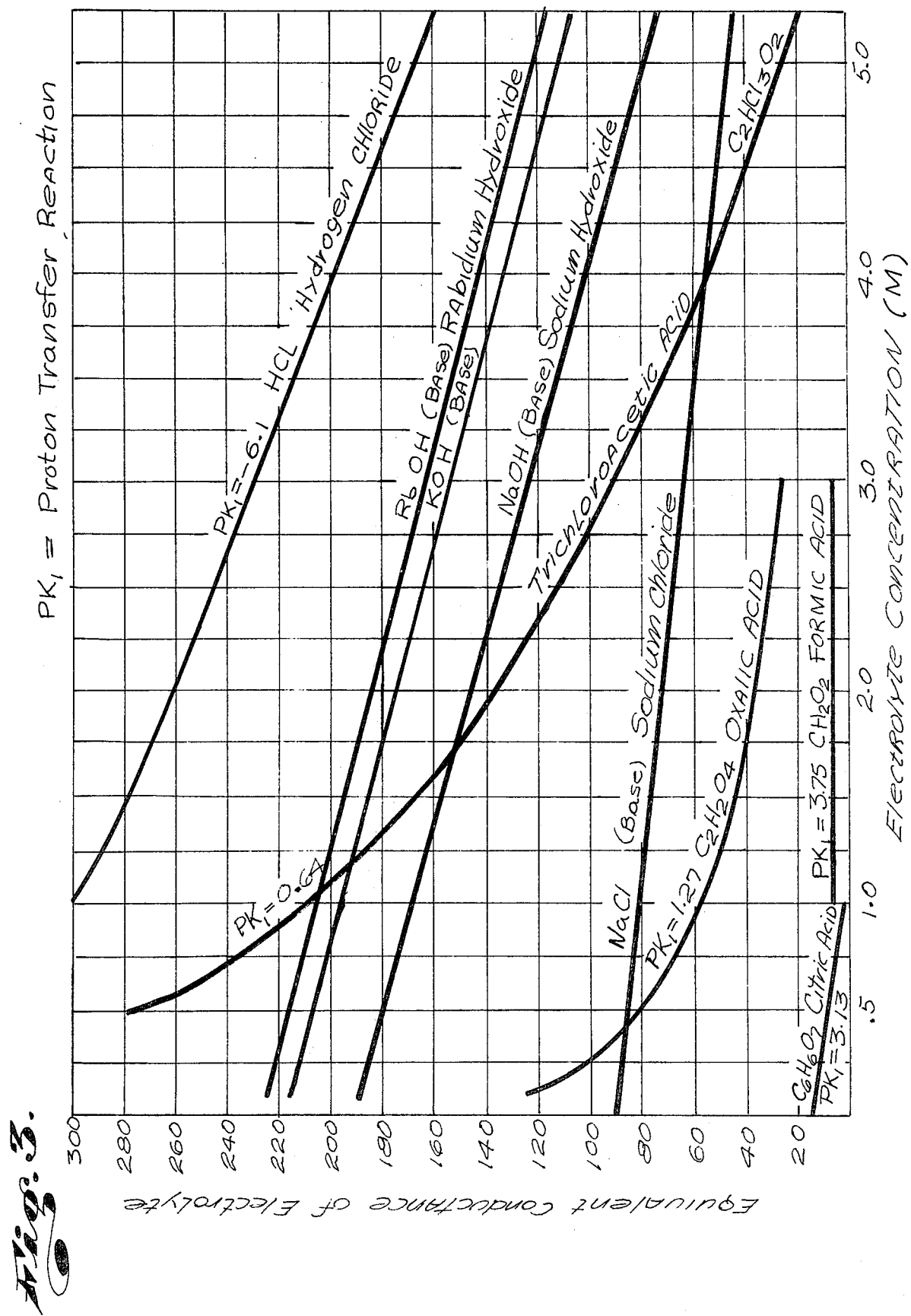
FIG. 3 is a comparison graph of electrolytes.

Referring to FIG. 1 of the drawings, the air metal fuel cell that I provide comprises a container or cell 10, an aqueous electrolyte 11 in the container 10, and a pair of electrodes 12 and 13 arranged in the container 10 in spaced relationship from each other and within the electrolyte.

The electrode 12 is the anode of the cell and is, in the preferred form and embodiment of my invention, established of aluminum. The other electrode 13 is the cathode of the cell and is established of porous carbon, sintered nickel or some other material with suitable oxygen activation catalyst for establishing desired ionic transfer in the cell structure.

The electrode 12 and 13 are shown connected by a conductor 14 with a load 15 and with an on and off switch 16 therein.

The oxidant of the cell is oxygen ($O_2$) of the air and the metal fuel of the anode 12 which, as noted above, is aluminum (AL). The air enters or is fed into the cell through the porous cathode 13 and the metal fuel or aluminum is within and is therefore fed directly in the cell.

In operation of the cell, oxygen ($O_2$) from the air and at the surface of the cathode 13 react with the water ($H_2O$) of the electrolyte 11 to form hydroxyl ions ($OH-$). During this reaction, electrons are removed from the cathode 13 resulting in a positive change at the cathode. The hydroxyl ions ($OH-$) travel through the electrolyte 11 from the cathode 13 to the anode 12. When the hydroxyl ions ($OH-$) meet the anode, metal atoms react therewith to form water and free electrons.

In the absence of an electrical connection between the anode 12 and cathode 13, as when the switch 16 is open, the above noted reaction quickly establishes an equilibrium where no metal (fuel) or oxidizer ($O_2$) are consumed. When a load 15 is connected between the anode and the cathode as by closing the switch 16, electrons are generated from the anode 12 when hydroxyl ions ($OH-$) combine with fuel metal ions. As the aluminum fuel metal is consumed in the foregoing manner, bi-products in the form of aluminum hydroxide and water accumulate in the electrolyte. The aluminum hydroxide (bi-product) must be periodically removed from the cell.

In FIG. 1, the equation of the above noted chemical reaction is suitably set forth.

In furtherance of and in the carrying out of my invention, the electrolyte 11 must be especially compounded to control the hydrogen ($H_2$) formed by corrosion reaction with the aluminum of the anode 12. In the case of an anode of pure aluminum (AL), the equation of the above reaction is $2Al^{+++}+6H_2O+2OH^-\rightarrow 2Al(OH)_4^- + 3H_2$.

In formulating an electrolyte in accordance with the present, invention, it is important to first note that when a strong alkalai such as sodium hydroxide (NaOH) and a strong acid, such as hydrochloric acid (HCl) (in aquaeous solutions) are mixed together, the equation of the chemical reaction therebetween is $(H^+ + Cl^-)+(Na^+ + OH^-)=Na^+ + Cl^-)+H_2O$. In such a reaction, the highly conductive hydrogen ions initially present in the solution are replaced by sodium ions which have a much lower conductance. Consequently, the sodium ions of lower conductance in the aqueous solution of sodium hydroxide and hydrochloric acid renders these materials poor selections for the compounding of a fuel cell electrolyte.

When the acid and base in the above solution are exactly neutralized, its PH is 7.0. In the immediate zone where the base and acid are neutralized and the PH of the electrolyte is 7.0, the PH can be dramatically and rapidly increased from 7.0 to 12.0 or 13.0 by the addition of a very small or minute quantity of base material in concentrated solution. This change in PH in an electrolyte mix of NaOH and HCl is graphically illustrated in FIG. 2 of the drawings.

This rapid and dramatic change in PH is characteristic of most electrolyte solutions composed of a mixture of base and acid material and is a characteristic which I have put to use in carrying out my invention, as will hereinafter be described.

The specific conductivity of the fuel cell electrolyte should be large or high so that the internal fuel cell resistance or ohmic drops occurring in the electrolyte between the anode and cathode are small.

The dissociation constants of acid and base materials give some indication of their strength as generators of hydrogen and hydroxyl ions. Thus, for example, acetic, formic and citric acids are quite weak, or have dissociation constants which are indicated by their high $PK_1$ values indicated in FIG. 3 of the drawings. This weakness or poor hydrogen and hydroxyl ion generating capability renders these electrolyte materials poor conductors of electricity and therefore less than desirable for use in establishing an electrolyte.

The dissociation constant of strong acids, such as hydrochloric acid and strong bases, such as potassium hydroxide are extremely high. Accordingly, these materials are good conductors of electricity when in solution.

The conductance or ability of an electrolyte to conduct current is determined by the number of ions, the charge carried by each ion, and by the speed of the ion. Therefore, the equivalent ionic conductance of an electrolyte depends on the rate at which ions travel through it, which rate of travel is determined by its ionic mobility. Ionic mobility is determined by the number of equilibrium positions established by ions in an electrolyte during their passage from one position to another.

In carrying out my invention, control of corrosion of the metal fuel or aluminum anode 12, by the electrolyte 11, is attained by establishing the electrolyte as a caustic or base solution having a high hydroxyl ionic mobility and a high equivalent ionic conductance. Such an electrolyte is established or made by an acid and base mixture in which both the acid and base have high equivalent ionic conductance values and wherein the acid has a low PK1 value, which value is a negative logarithm of the acidic dissociation constant.

Referring to FIG. 3 of the drawings, it will be noted that rubidium, potassium and sodium hydroxides are desirable or good base materials for the electrolyte due to their high equivalent ionic conductance values which is between 180 and 240. Further, it will be noted that Trichloroacetic acid and those other acids which have a low $PK_1$ value in the range between 0.3 and 1.0 and which have equivalent ionic conductance in excess of 120, are desirable and good acid materials for the electrolyte. Trichloroacetic acid, which has a $PK_1$ value of 0.64 and and equivalent ionic conductance value which ranges to at least 280, is the most desirable acid I have found.

A typical and preferred electrolyte provided by my invention is made up or compounded of potassium hydroxide and trichloroacetic acid. Referring to FIG. 4 of the drawings, to start, the electrolyte consists of 24.46% 10 M potassium hydroxide (KOH), in aqueous solution, mixed with 75.54% 3 M of trichloroacetic acid ($C_2HCl_3O_2$) in aqueous solution. This electrolyte is substantially neutral and has a PH of aout 7.4. When this neutral electrolyte is used in a cell with a 99.99% pure aluminum anode, the passage of hydroxyl ions ($OH^-$), through the electrolyte is zero or dormant and no aluminum of the anode is consumed by corrosion.

When the electrolyte is in the above noted neutral condition, the cell is in a non-operational mode, noted in FIG. 4 as its STORAGE ZONE, and can be stored indefinitely.

Preparatory to putting the cell into a working or operational mode, the proportioning of the acid and base solution of the electrolyte is changed to about 70% acid and 30% base by the addition of base solution. This change increases the PH of the electrolyte to about 14.0. With the PH increased to 14.0, and with the electric circuit between the electrodes of the cell open, there is no corrosion of the 99.99% pure aluminum anode and no release of hydrogen gas takes place. The current density in the cell at this time is about 20% of maximum theoretical efficiency. When the cell is in this last noted condition, it can be said to be, and in FIG. 4 of the drawings is noted as being, in its OFF ZONE.

When the ratio of base and acid solution in the electrolyte is again changed or adjusted to 60% acid and 40% base, the PH increases to about 14.6. At this elevated PH, the electrolyte becomes slightly corrosive with respect to the aluminum anode and the anode commences to corrode, releasing hydrogen gas. In carefully and repeatedly carried out te ts about 1/10 milliliter of hydrogen gas is generated and released from 5 square centimeters of aluminum anode in 168 seconds. Under these conditions, the current density in the electrolyte is about 80% maximum theoretical efficiency. When the cell is in this last noted condition, it is fully operational and can be said to be, and in FIG. 4 of the drawings is noted as being, in its WORKING ZONE, and is in condition to effectively generate a desired electric current.

The mix of base and acid solution establishing the working zone can extend from about 40% to 50% by weight of base, to 60% to 50% by weight of acid, when in concentrations of 0.5 M to 50 M.

In accordance with the foregoing, my invention resides in part in the establishing of a metal-air fuel cell with an aluminum anode and a caustic electrolyte comprised of a base solution having an equivalent ionic conductance of at least 200, when tested at a concentration of 0.5 M, an acid solution having an equivalent ionic conductance of at least 250 when tested at a concentration of 0.5 M and a $PK_1$ which is below 1.0; said base and acid solutions are proportioned or mixed to maintain the PH of the electrolyte below 7 when the cell is out of service and about 14 when the cell is in service.

In accordance with and in furtherance of my invention, corrosion inhibitors such as chromium, copper gallium, iron, manganese, magnesium, mercury, titanium, silicone, tin, tungsten and zinc can be advantageously alloyed with at least 99% pure aluminum to inhibit corrosion of the anode and thereby enable the use of other than the more costly 99.99% pure aluminum and to extend the working zone of the electrolyte to approximately 60% base and 40% acid, as indicated in FIG. 4 of the drawings. In practice, 0.001 to 1.0 percent of any one or a combination of the above elements alloyed with at least 99% pure aluminum will not adversely affect and will afford certain advantages in the fuel cell that I provide. In one typical series of tests, using an anode of aluminum which was specified as containing AL 99.00 min. CU 0.05–0.20, Mn. 0.05 max. Zn 10 max. other each 0.05 max.; an electrolyte made up of 50% 10 M potassium hydroxide base solution and 50% 3 M triochloroacetic acid solution was used. The PH of the electrolyte was 15.6. During these tests, about 1/10 milliliter of hydrogen ($H_2$) gas was generated and released from 5 square centimeters of the aluminum anode in 12 seconds.

While the above resulted in more chemical polarization, the operational zone of the cell was notably extended because the anode reaction was kinetically slowed by controlling the activation barriers of the anode with the corrosion inhibitors alloyed with the aluminum.

While such limited use of corrosion inhibitors, alloyed with the aluminum of the anode, affords certain benefits or advantages, those advantages are notably limited and are compromised in whole or in part by those disadvantages which are to be found.

In accordance with the above and in light of certain tests that I have made, I have concluded that the advantages to be gained by the alloying of corrosion inhibitors with the at least 99% pure aluminum of which the anode 12 of my cell structure is established, is effective to extend the effective operating zone of the cell. If the aluminum remains at least 99% pure, or no more than 1.0% of the anode is other than pure aluminum, the disadvantages are totally outweighed by advantages sought to be gained.

It is important to note that while the above noted addition or use of corrosion inhibitors affords greater latitudes with respect to the ratio of base and acid solutions going to make up the electrolyte, and therefore enables increasing the PH of the electrolyte slightly, it does not otherwise alter or affect the basic characteristics of my new and novel electrolyte.

In light of the foregoing, it will be apparent that I provide a novel fuel-air cell in which a special and novel electrolyte is provided whereby the fuel or anode of the cell can and is established of light weight, abundant and inexpensive aluminum and a cell in which corrosion of the aluminum anode is effectively controlled and slowed to a degree that its use as a fuel is economically and functionally efficient and practical.

While I have described the anode of my new cell as being established of aluminum, I have found that it can be established of magnesium with comparable beneficial end results.

Having described only typical preferred forms and/or applications of my invention, I do not wish to be limited to the specific details herein set forth, but wish to reserve to myself any modifications and/or variations that may appear to those skilled in the art and which fall within the scope of the following claims:

Having described my invention, I claim:

1. A fuel-air cell comprising a container, a metal fuel anode in the container, a cathode of porous conductive material dissimilar from the metal of the anode with a portion in the container in spaced relationship from the anode and a caustic fluid electrolyte in the container between and contacting the anode and cathode; the electrolyte is comprised of a mixture of base material in aqueous solution, selected from base materials having equivalent ionic conductance values of 180 or higher when tested in concentrations of 0.05 M and an acid material in aqueous solution which is selected from those acid materials having equivalent ionic conductance values of 100 or higher when tested in concentrations of 0.05 M and proton transfer reaction ($PK_1$) values less than 1.0.

2. The fuel-air cell set forth in claim 1 in which the ratios of acid and base material in the electrolyte are varied to change the PH of the electrolyte from below 7 to above 14 and to thereby put the cell in chemically dormant storage and chemically active working conditions.

3. The fuel-air cell set forth in claim 1 wherein the electrolyte base material is potassium hydroxide and the acid material is trichloroacetic acid and wherein the electrolyte includes 40 to 50 parts by weight of base to 60 to 50 parts by weight of acid in concentrations of 0.5 M to 50 M, and has a PH less than 7 and the cell is non-operational when it includes 40 parts base and a PH greater than 14 when it includes 60 parts base and the cell is chemically active and operational.

4. The fuel-air cell set forth in claim 1 wherein the anode is established of at least 99% pure aluminum.

5. The fuel-air cell set forth in claim 2 wherein the anode is established of at least 99% pure aluminum.

6. The fuel-air cell set forth in claim 3 wherein the anode is established of at least 99% pure aluminum.

7. The fuel-air cell set forth in claim 1 wherein the anode is established of at least 99% pure magnesium.

8. The fuel-air cell set forth in claim 2 wherein the anode is established of at least 99% pure magnesium.

9. The fuel-air cell set forth in claim 3 wherein the anode is established of at least 99% pure magnesium.

10. The fuel-air cell set forth in claim 3 wherein the anode is at least 99% pure aluminum and is alloyed with 1% of less of one or more corrosion inhibiting metals.

11. The fuel-air cell set forth in claim 10 wherein corrosion inhibitors, chromium, copper, gallium, iron, manganese, magnesium, mercury, titanium, silicone, tin, tungsten and zinc are alloyed in 0.001 to 1.0 percent of any one or a combination of above elements with at least 99% pure aluminum.

* * * * *